(Model.) 2 Sheets—Sheet 1.

M. J. LORRAINE & C. T. AUBIN.
CAR COUPLING.

No. 369,195. Patented Aug. 30, 1887.

ATTEST:

INVENTORS:
Madison J. Lorraine
Charles T. Aubin (Model.) 2 Sheets—Sheet 2.
M. J. LORRAINE & C. T. AUBIN.
CAR COUPLING.
No. 369,195. Patented Aug. 30, 1887.
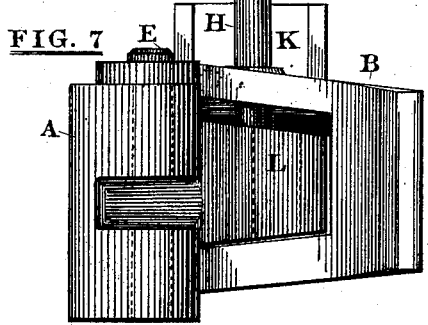
FIG. 7
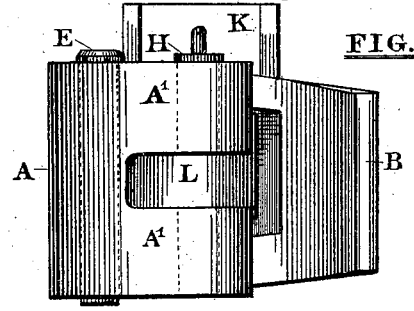
FIG. 8
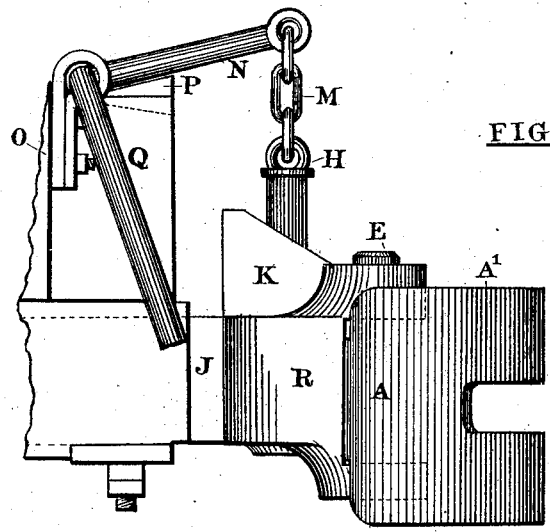
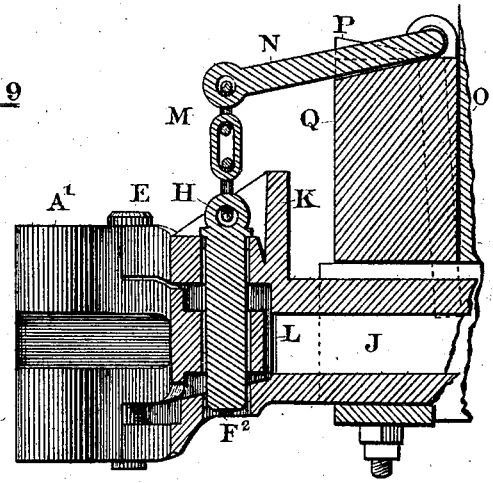
FIG. 9
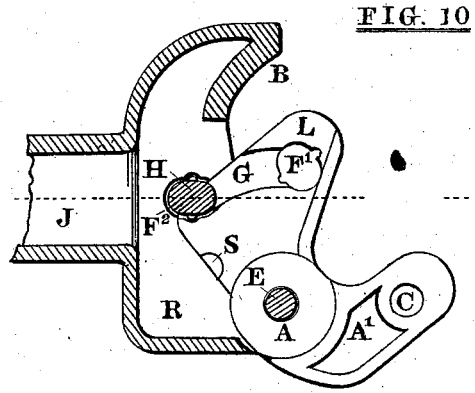
FIG. 10
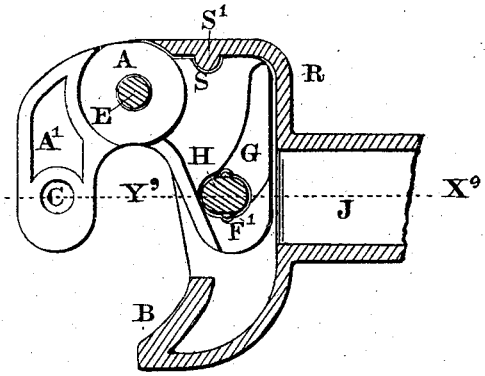
ATTEST:
INVENTORS:

United States Patent Office.

MADISON J. LORRAINE AND CHARLES T. AUBIN, OF ST. LOUIS, MISSOURI.

CAR-COUPLING.

SPECIFICATION forming part of Letters Patent No. 369,195, dated August 30, 1887.

Application filed March 15, 1887. Serial No. 230,952. (Model.)

*To all whom it may concern:*

Be it known that we, MADISON J. LORRAINE and CHARLES T. AUBIN, of the city of St. Louis, in the State of Missouri, have invented a new and useful Improvement in Car-Couplings, of which the following is a full, clear, and exact description.

Our invention relates to that class of car-couplings known as "vertical plane," and having a pivoted outwardly-opening coupling-head or clutch and an extended guide-arm or buffer.

The object of our invention is to make a vertical-plane coupling free from complicated parts, locking by means of a simple automatic gravity-pin, requiring no adjusting and made in one piece; to make a vertical-plane coupling in which, when the coupling-head is unlocked and released, said coupling-head, by reason of its own weight, will turn outwardly and open, and thus automatically set itself in position to effect a coupling with a similar opposing coupling-head, which may be either open or closed; to provide an improved and simplified means of setting not to couple; to so construct and arrange the coupling-head that it will be unusually strong, and to make a coupling that will perform the work under all circumstances, as well on the sharpest curves as on a tangent, and with the greatest variations in height of the opposing parts—in fine, to make a car-coupling that will be simple in construction, automatic in action, and free from springs, and superfluous and loose fitting parts, that will combine strength and durability with simplicity and perfection of action.

Figure 4:
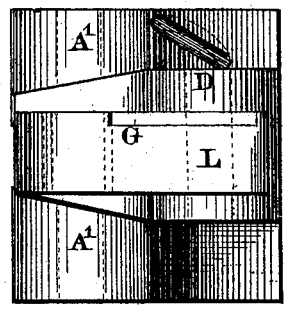
Figure 2:
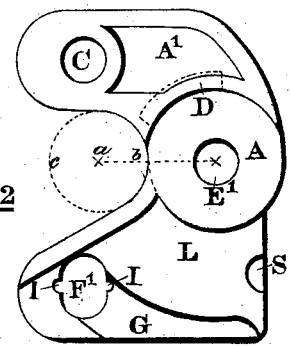
Figure 1:
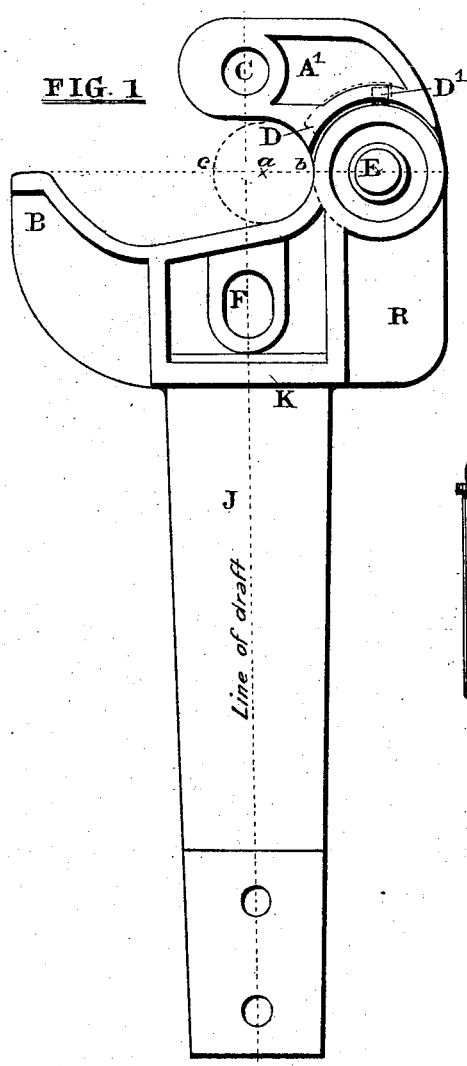
Figure 3:
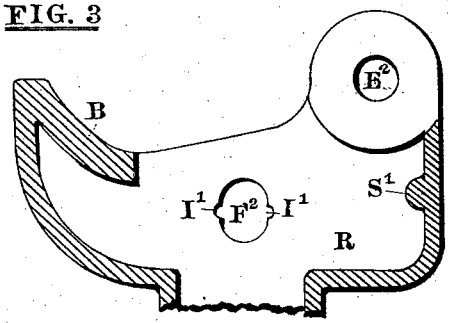
Figure 5:
Figure 6:
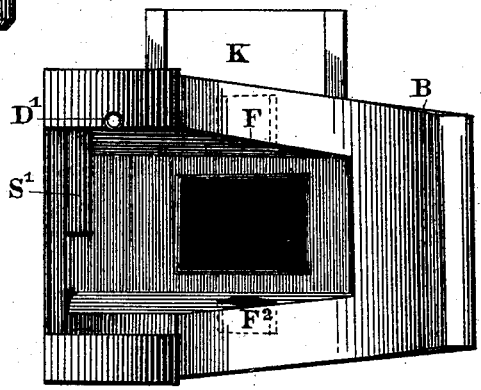

In the drawings herewith, illustrating our invention, Figure 1 is a plan of draw-head, with coupling-head attached and closed. Fig. 2 is a plan of coupling-head detached from draw-head. Fig. 3 is a horizontal section showing lower half of draw-head separate from coupling-head. Fig. 4 is a rear end view of coupling-head. Fig. 5 is a side view of locking-pin. Fig. 6 is an end view of draw-head, looking into same. Fig. 7 is a front end view of coupling-head attached to draw-head, with coupling-head open and down. Fig. 8 is a front end view of coupling-head attached to draw-head, with coupling-head closed and up and locked. Fig. 9 is a side view of two draw-heads, with coupling-heads attached, about to make a coupling, with the left-hand coupling-head open and down and the right-hand coupling-head closed, up, and locked, and showing vertical longitudinal section of draw-head through line $X^9 Y^9$ of Fig. 10. Fig. 10 is a horizontal longitudinal section of two opposing draw-heads, with coupling-heads attached, about to make a coupling, with left-hand coupling-head unlocked and open and the right-hand coupling-head closed and locked.

The same letters of reference refer to the same parts throughout.

A is the coupling-head, which is pivoted at its center to the draw-head, (said center being in direct line with prolongation of radius $a\ b$ of circle $a\ b\ c$, and said radius being at right-angle to the line of the draft,) and which, viewed in position shown in Fig. 2, has a general ⊃ shape.

A' is the outer arm or clutch of the ⊃-shaped coupling-head.

B is the buffer.

C is the opening in outer arm of coupling-head for insertion of a pin when coupling with common draw-bar.

D is inclined groove in coupling-head, made for projecting knob or pin D' to travel in and automatically open coupling-head. Said groove may also be made curved, as shown by dotted lines.

E is pin that pivots coupling-head to draw-head. E' is hole in center of coupling-head for reception of pivot E, and $E^2$ is hole in bottom of draw-head to receive E, and there is a similar hole in top of draw-head for same purpose.

F is hole in top of draw-head for reception of locking pin.

F' is hole which perforates inner arm of coupling-head for purpose of receiving locking-pin, and $F^2$ is a hole in bottom of draw-head for same purpose.

G is groove in inner arm of coupling-head for guiding locking-pin as hole F' moves away from or toward it.

H is locking-pin, (said locking-pin can be either oblong, round, or square,) and $I^2$ is knob projecting from side of locking-pin to keep it from being drawn out of hole F.

I I are recesses in side of hole F' to receive knob I², and I' I' are corresponding recesses in side of hole F³.

J is the draw-bar.

K is a stop-block on top of draw-head.

L is inner arm of ⊃-shaped coupling-head.

M is chain for raising and supporting locking-pin.

N is lever-arm attached to chain for operating coupling-pin.

O is car-body.

P is block on top of dead-wood Q for supporting lever-arm in an up position.

R is the draw-head.

S is recess in arm L, made to receive rib S', which is cast to side of draw-head.

X⁹ Y⁹ is line drawn longitudinally through middle of draw-head.

The arm A' of coupling-head is divided so as to receive link when coupling with common draw-head.

The action of coupling is as follows: Should the two similarly-constructed draw-heads approach each other in the position shown in Figs. 9 and 10, the arm A' of the closed coupling-head encounters the point of the arm L of the open coupling-head, turning it partly inward, when the point of the arm A' of the open coupling-head then encounters the concave face of the guide-arm B, which forces it completely around to the limit of its inward movement. As the coupling-head turns inwardly, the projecting knob or pin D' being at the commencement of this movement at the top of the inclined or curved groove D, the upper side of the groove travels up and across the pin D', and by this movement raises the coupling-head up into a space left at the top to allow for this upward movement. At the same time the coupling-head is turning and raising the pin H, which rests on top of the inner arm, L, is guided in the guide-groove G toward the hole F', and when it is over said hole the pin H falls through it and into the hole F², and thus securely holding and locking the coupling-head. The rib S', fitting into the recess S, is intended to give the coupling-head a solid bearing against draw-head when the coupling-head is locked by the pin H.

For uncoupling, the lever-arm N or any suitable device is used. To uncouple, the arm N is raised, and this in turn, through the chain M, raises the pin H. The coupling-head has then nothing to retain and support it, and as the opposing head draws away from it the action of gravity draws the coupling-head down into the vacant space beneath, and as it falls, by reason of the top of the groove D traveling down and across the knob or pin D', the coupling-head turns and opens and is set into position for another coupling. Should both heads be closed when desiring to make a coupling, the pin H is raised and the automatic action of the coupling-head immediately opens and turns it ready for coupling. After the coupling-head is open the pin H is allowed to fall, and rests in the position shown in Figs. 7 and 10 in the groove and on top of the arm L of the coupling-head. Should it be necessary to set not to couple, the lever-arm N is raised and pushed or pulled on top of the block P, Fig. 9, and as this keeps the pin H in a raised position the coupling-head can therefore not be locked, and a coupling cannot be effected. It is only necessary that one pin be operated to set to couple, to uncouple, or set not to couple.

The object of pivoting the coupling-head at its center is threefold: First, if the coupling-head was otherwise pivoted, by reason of its shape when uncoupled the arm L of the unlocked head would bind with arm A' of its neighbor and prevent uncoupling with facility and this it would do especially on curves; second, if the coupling-head were pivoted back of its center or in the arm L it would then be necessary to open both heads to either couple or uncouple, which would be unnecessary and faulty; third, if the coupling-head were pivoted in its forward arm, A', when the coupling-head was entirely open the arm L would then come entirely without the draw-head, and there would be nothing to support the locking-pin in a raised position, and it would accordingly fall, and when coupling it would be necessary to construct some mechanism to automatically raise said locking-pin, which would be complicated and is unnecessary.

The particular construction of the coupling, as shown and claimed, makes it exceedingly strong. Those parts that in other couplings of this class are cut away, weakening them at the place where strength is most requisite, are by this construction strengthened and the metal is distributed at the points most needed.

We claim—

1. The combination of the ⊃-shaped coupling-head pivoted at its center, the draw-head R, and the automatic locking-pin H, for the purposes set forth.

2. The combination of the ⊃-shaped coupling-head A, the draw-head R, the pivot E, the inclined (or curved) groove D, and the knob or pin D', for the purpose of making an automatically-opening coupling-head.

3. the combination of the ⊃-shaped coupling-head, the groove G, the draw-head, the locking-pin resting on top of the arm L when the coupling-head is open and falling through the holes F' and F² when the coupling-head is closed, and the lever-arm and chain, substantially as described.

4. The combination of the ⊃-shaped coupling-head pivoted at its center, the draw-head, the locking-pin, the car-body, the lever-arm and chain, and the block P, attached to the timber Q, for the purpose of setting not to couple.

5. The combination of the coupling-head having the grooves D and G and the holes E' and F', the pivot E, the draw-head having the holes E² F F², and the knob D', the buffer B, and the pin H, having the projecting knob I², substantially as described.

6. The combination of the ⊃-shaped coupling-head having the recess S, the locking-pin, and the draw-head having the rib S', which fits in the recess S only when the coupling-head is closed, for making the coupling-head firm and secure when locked.

7. The combination of a coupling-head turning laterally on its pivot, and having an external arm intended to engage with and grip a like fellow, and an inner arm intended to engage with some locking mechanism, with a draw-head carrying a common gravity vertically-moving locking-pin, said automatically-locking pin locking such inner arm by passing completely through a hole perforated in the inner arm of the coupling-head, substantially as set forth.

8. The combination of two similarly-constructed draw-heads having ⊃-shaped pivoted automatically-opening coupling-heads and the automatic locking-pins, substantially as described, for the purpose of making an automatic coupling.

MADISON J. LORRAINE.
CHARLES T. AUBIN.

Witnesses:
 EDW. E. ACTON,
 JAMES A. WATERWORTH.